(12) United States Patent
Ono et al.

(10) Patent No.: US 11,387,894 B2
(45) Date of Patent: Jul. 12, 2022

(54) SATELLITE RECEIVER AND SATELLITE COMMUNICATION SYSTEM

(71) Applicant: MITSUBISHI ELECTRIC CORPORATION, Chiyoda-ku (JP)

(72) Inventors: Hitomi Ono, Chiyoda-ku (JP); Akinori Fujimura, Chiyoda-ku (JP); Terumi Sunaga, Chiyoda-ku (JP); Toshiyasu Tsunoda, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/965,076

(22) PCT Filed: Jan. 30, 2019

(86) PCT No.: PCT/JP2019/003112
§ 371 (c)(1),
(2) Date: Jul. 27, 2020

(87) PCT Pub. No.: WO2019/155952
PCT Pub. Date: Aug. 15, 2019

(65) Prior Publication Data
US 2021/0119694 A1    Apr. 22, 2021

(30) Foreign Application Priority Data

Feb. 9, 2018 (JP) .............................. JP2018-021742

(51) Int. Cl.
*H04B 7/185* (2006.01)
*H04B 7/06* (2006.01)
(Continued)

(52) U.S. Cl.
CPC ....... *H04B 7/18513* (2013.01); *H04B 7/0617* (2013.01); *H04B 7/08* (2013.01); *H04L 27/26* (2013.01)

(58) Field of Classification Search
CPC .... H04B 7/18513; H04B 7/0617; H04B 7/08; H04B 7/18539; H04B 7/0865;
(Continued)

(56) References Cited

U.S. PATENT DOCUMENTS

2009/0060520 A1* 3/2009 Cole .................. H04B 10/0795
                                                             398/140
2014/0036765 A1    2/2014 Fujimura et al.
(Continued)

FOREIGN PATENT DOCUMENTS

EP          1 093 268 A2    4/2001
JP         2011-130367 A    6/2011
(Continued)

OTHER PUBLICATIONS

International Search Report dated Mar. 12, 2019 in PCT/JP2019/003112 filed Jan. 30, 2019, 2 pages.
(Continued)

*Primary Examiner* — Fred A Casca
(74) *Attorney, Agent, or Firm* — Oblon, McClelland, Maier & Neustadt, L.L.P.

(57) ABSTRACT

A satellite receiver includes: N reception antenna elements; N demultiplexing units; a correlation detection unit configured to perform correlation processing on each of reception signals demultiplexed by the N demultiplexing units with a reception antenna element that receives the highest power being set as a reference element so as to calculate a relative phase difference, and calculate an excitation coefficient for cancelling a phase difference between the N reception antenna elements for each of sub-channels based on the calculated relative phase difference; N phase compensation units configured to multiply the reception signals demultiplexed by the N demultiplexing units, respectively, by the excitation coefficient for each of the sub-channels; and a
(Continued)

combiner configured to combine multiplication results from the N phase compensation units for each of the sub-channels to generate output signals.

7 Claims, 10 Drawing Sheets

(51) Int. Cl.
*H04B 7/08* (2006.01)
*H04L 27/26* (2006.01)

(58) Field of Classification Search
CPC ............... H04B 7/084; H04B 7/18508; H04B 7/18578; H04B 7/18515; H04B 7/18528; H04B 7/18523; H04B 1/18; H04B 7/2041; H04B 7/0632; H04L 27/26; H04W 84/06; H04W 12/79
See application file for complete search history.

(56) References Cited

U.S. PATENT DOCUMENTS

2015/0381266 A1  12/2015  Fujimura
2018/0241464 A1* 8/2018  Michaels ............. H04B 7/2041

FOREIGN PATENT DOCUMENTS

WO    WO 2012/147753 A1   11/2012
WO    WO 2014/125600 A1   8/2014

OTHER PUBLICATIONS

Extended European Search Report dated Mar. 9, 2021 in European Patent Application No. 19751635.4, 10 pages.

* cited by examiner

SATELLITE RECEIVER AND SATELLITE COMMUNICATION SYSTEM

TECHNICAL FIELD

The present invention relates to improvements in communication efficiency of a satellite receiver and a satellite communication system.

BACKGROUND ART

Along with an increase in communication capacity, there is a demand for relay satellite systems that flexibly control communication traffic. The communication traffic may be optimized through controlling frequency flexibility, and controlling area flexibility. To control the area flexibility, there is a beam forming network (BFN) for forming transmission beams and reception beams through controlling excitation coefficients of a plurality of antennas, that is, amplitudes and phases thereof.

Beam forming methods include microwave beam forming (MBF) using a phase shifter for microwaves, and digital beam forming (DBF) that adopts digital signal processing to control excitation coefficients. The digital beam forming enables an integrated network compared with the microwave beam forming, and hence the number of beams can be increased.

For example, in a wireless communication apparatus described in Patent Literature 1, the following means is described as a method of digital beam forming: a reception beam is subjected to frequency division, followed by sum-of-product operation of resultant beams and weighting coefficients in a digital beam former so as to form beams. With this configuration, DBF operation is not performed with respect to frequencies not assigned to input signals, to thereby save power consumption during digital processing.

CITATION LIST

Patent Literature

[PTL 1] JP 2011-130367 A

SUMMARY OF INVENTION

Technical Problem

The related-art wireless communication apparatus of Patent Literature 1 produces an effect of generating a plurality of beams through digital processing while reducing a circuit scale by adopting the above-mentioned configuration. However, the related-art wireless communication apparatus of Patent Literature 1 has the following problem.

In the related-art wireless communication apparatus of Patent Literature 1, the weighting coefficients used for the sum-of-product operation in the digital beam former are generally set so as to generate a desired beam pattern based on simulation of an antenna pattern of a system. Such simulation is performed based on a design parameter of the entire system.

However, in the related-art wireless communication apparatus, a desired beam pattern may not be obtained in some cases due to variations in characteristics of components aboard the satellite or other factors. The related-art wireless communication apparatus also has a problem in that, when a user moves, reception efficiency is lowered unless information about the user's movement is obtained by some method. The same applies to any beam forming methods other than the DBF.

The present invention has been made to solve the above-mentioned problems, and an object of the present invention is to provide a satellite receiver and a satellite communication system with which, even when characteristics of components aboard the satellite vary or a user moves, deterioration in communication quality is prevented.

Solution to Problem

According to one embodiment of the present invention, there is provided a satellite receiver, including: N reception antenna elements; N demultiplexing units configured to demultiplex reception signals from the N reception antenna elements into sub-channels; a correlation detection unit configured to perform correlation processing on each of the reception signals demultiplexed by the N demultiplexing units with a reception antenna element that receives the highest power being set as a reference element so as to calculate a relative phase difference, and calculate an excitation coefficient for cancelling a phase difference between the N reception antenna elements for each of the sub-channels based on the calculated relative phase difference; N phase compensation units configured to multiply the reception signals demultiplexed by the N demultiplexing units, respectively, by the excitation coefficient for each of the sub-channels; and a combiner configured to combine multiplication results from the N phase compensation units for each of the sub-channels to generate output signals.

Further, according to one embodiment of the present invention, there is provided a satellite communication system, including: a satellite receiver; a switch; and a satellite transmitter, the satellite receiver including: N reception antenna elements; N demultiplexing units configured to demultiplex reception signals from the N reception antenna elements into sub-channels; a correlation detection unit configured to perform correlation processing on each of the reception signals demultiplexed by the N demultiplexing units with a reception antenna element that receives the highest power being set as a reference element so as to calculate a relative phase difference, and calculate an excitation coefficient for cancelling a phase difference between the N reception antenna elements for each of the sub-channels based on the calculated relative phase difference; N phase compensation units configured to multiply the reception signals demultiplexed by the N demultiplexing units, respectively, by the excitation coefficient for each of the sub-channels; and a combiner configured to combine multiplication results from the N phase compensation units for each of the sub-channels to generate output signals corresponding to the N reception antenna elements, the switch being configured to exchange the output signals generated by the combiner for each of the sub-channels in a frequency domain, to output transmission signals, the satellite transmitter including: a storage device configured to store therein a transmission excitation coefficient associated with a transmission direction of a corresponding transmission beam; N phase shift units configured to read from the storage device the transmission excitation coefficient in accordance with the transmission direction of a corresponding transmission beam, and multiply a corresponding transmission signal output from the switch by the read transmission excitation coefficient; N multiplexing units configured to multiplex multiplication results from the N phase shift units on a frequency axis; and N transmission antennas configured to emit signals multiplexed by the N multiplexing units to a space so as to generate transmission beams.

Advantageous Effects of Invention

According to one embodiment of the present invention, there is provided the configuration that enables improvements in reception efficiency for a plurality of signal senders on the ground. Consequently, it is possible to achieve the satellite receiver and the satellite communication system, with which even when the characteristics of the components aboard the satellite vary or the user moves, the deterioration in communication quality is prevented.

DESCRIPTION OF EMBODIMENTS

In order to describe the present invention in more detail, modes for carrying out the present invention are described below with reference to the accompanying drawings.

First Embodiment

Figure 1:
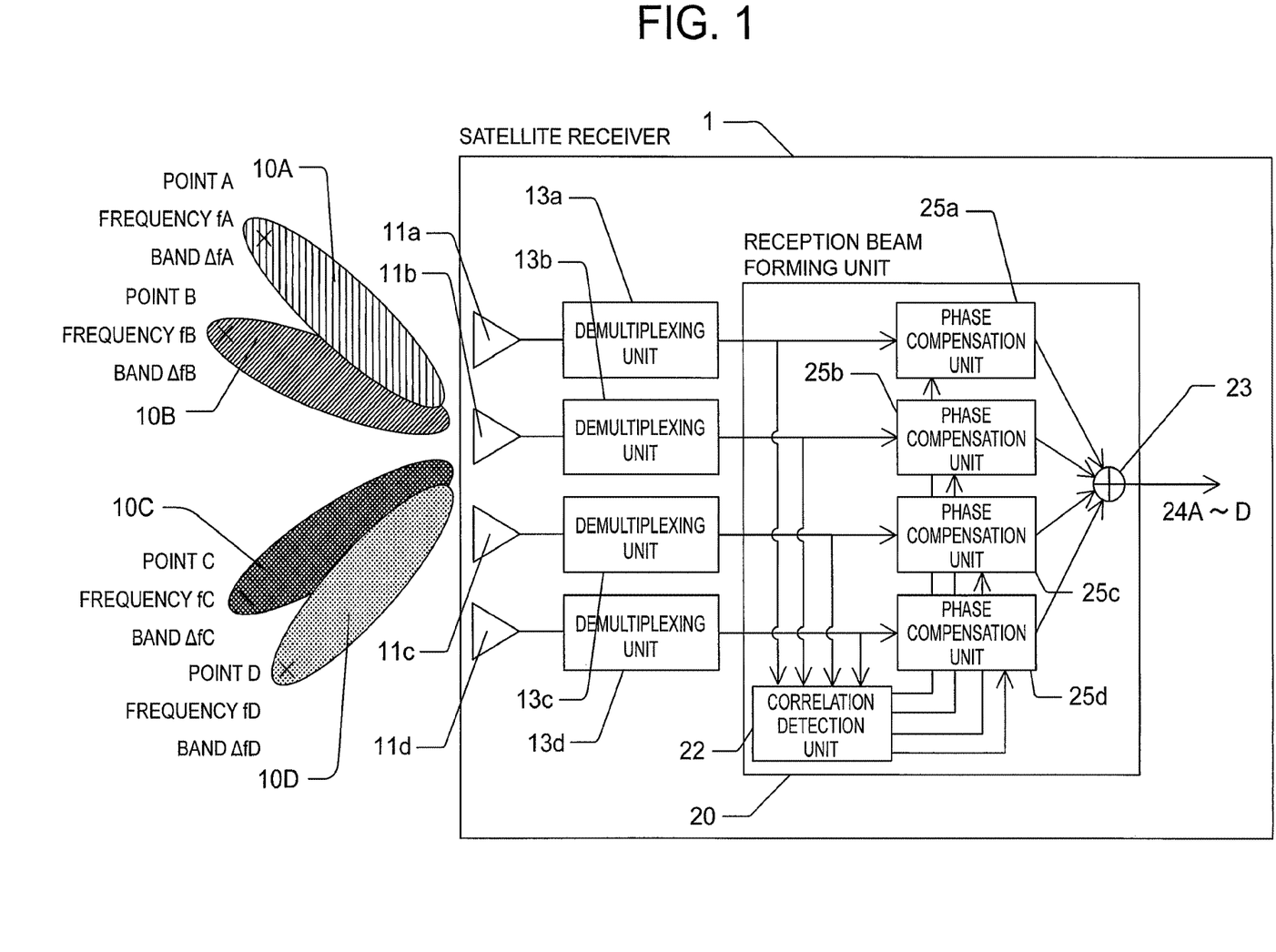
FIG. 1 is a diagram for illustrating an internal configuration of a satellite receiver according to a first embodiment of the present invention.

FIG. 1 is a diagram for illustrating an internal configuration of a satellite receiver according to a first embodiment of the present invention. A satellite receiver 1 according to the first embodiment as illustrated in FIG. 1 includes reception antenna elements 11a to 11d, demultiplexing units 13a to 13d, and a reception beam forming unit 20. Further, the reception beam forming unit 20 includes a correlation detection unit 22, a combiner 23, and phase compensation units 25a to 25d.

In FIG. 1, the satellite receiver 1 receives communication signals from four points, or points A to D, as reception beams 10A to 10D at the same time. In this example, a frequency fA is assigned to the reception beam 10A, a frequency fB is assigned to the reception beam 10B, a frequency fC is assigned to the reception beam 10C, and a frequency fD is assigned to the reception beam 10D. Bands of the reception beams 10A to 10D are defined as ΔfA, ΔfB, ΔfC, and ΔfD, respectively.

The four reception antenna elements 11a to 11d respectively receive the four reception beams 10A to 10D at the same time. The demultiplexing units 13a to 13d are provided in a one-to-one correspondence with the reception antenna elements 11a to 11d, and configured to demultiplex corresponding reception signals into sub-channels by a certain frequency band.

The correlation detection unit 22 is configured to calculate correlation between the reception signals demultiplexed by the demultiplexing units 13a to 13d for each sub-channel. The phase compensation units 25a to 25d are provided in a one-to-one correspondence with the demultiplexing units 13a to 13d, and configured to perform phase compensation on the demultiplexed reception signals based on the correlation calculated by the correlation detection unit 22. Further, the combiner 23 is configured to combine the signals that have been phase-compensated by the phase compensation units 25a to 25d, to generate output signals 24A to 24D.

The satellite receiver 1 according to the present invention has a function of maximizing output power of the output signals 24A to 24D that are finally output. In this connection, a specific operation thereof is described below on the assumption that points to transmit communication signals at the same time are four points (A, B, C, and D) and the number of reception antenna elements is four (a to d) as illustrated in FIG. 1.

As described above, it is assumed that the reception beams 10A to 10D corresponding to the communication signals transmitted from the four transmission points A to D have the frequencies fA to fD, respectively, and the reception beams 10A to 10D are in the bands Δfa to Δfd, respectively. The four transmission points A to D are assumed as certain points on the ground, which are covered by radiation patterns of the reception antenna elements 11a to 11d.

The communication signals transmitted from the points A to D are received by the reception antenna elements 11a to 11d, respectively. The reception beams 10A to 10D are spatially distributed and thus are input as the same signal by all the reception antenna elements 11a to 11d.

In general, a phase difference occurs between the reception antenna elements in accordance with a distance from each of the reception antenna elements 11a to 11d to the reception beam forming unit 20. However, in this example, it is ideally assumed, for simple description, that the reception antenna elements have no difference in path length.

The demultiplexing unit 13a is configured to demultiplex the signal received via the reception antenna element 11a into sub-channels of a band Δfch. Similarly, the demultiplexing units 13b to 13d are configured to respectively demultiplex the signals received via the reception antenna elements 11b to 11d into sub-channels of the band Δfch.

The reception beam forming unit 20 is configured to receive the signals demultiplexed by the demultiplexing units 13a to 13d. It is not always required to provide the reception beam forming unit 20 for each beam when the reception beam forming unit 20 has a function of phase-compensating each sub-channel. In this case, it is only required to provide at least one reception beam forming unit 20 as illustrated in FIG. 1.

Figure 2A:
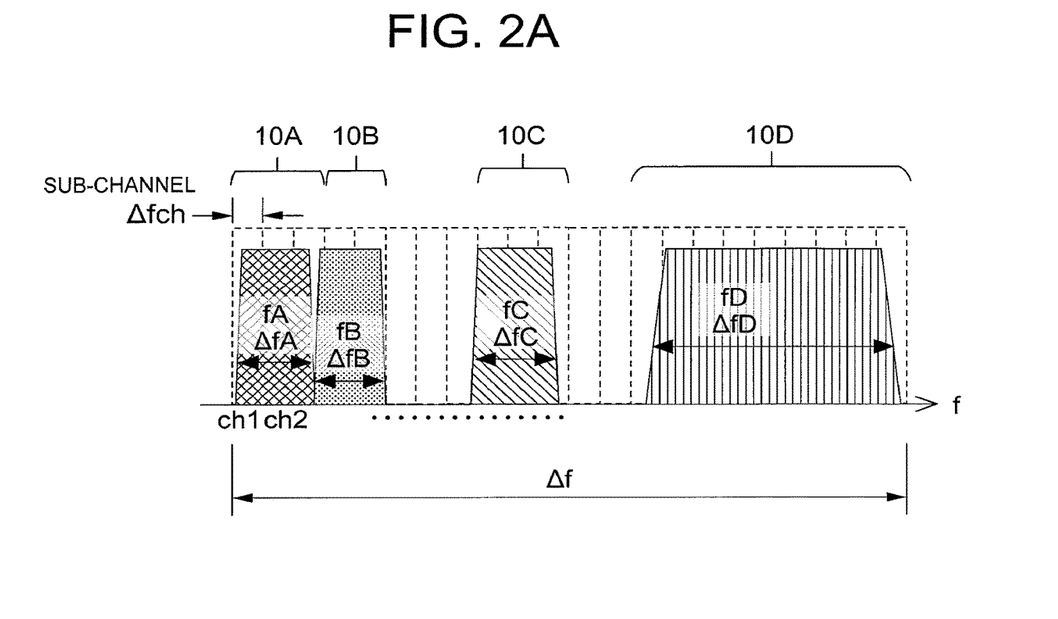
FIG. 2A is an explanatory view for illustrating an outline of demultiplexing processing in the first embodiment of the present invention.
Figure 2B:
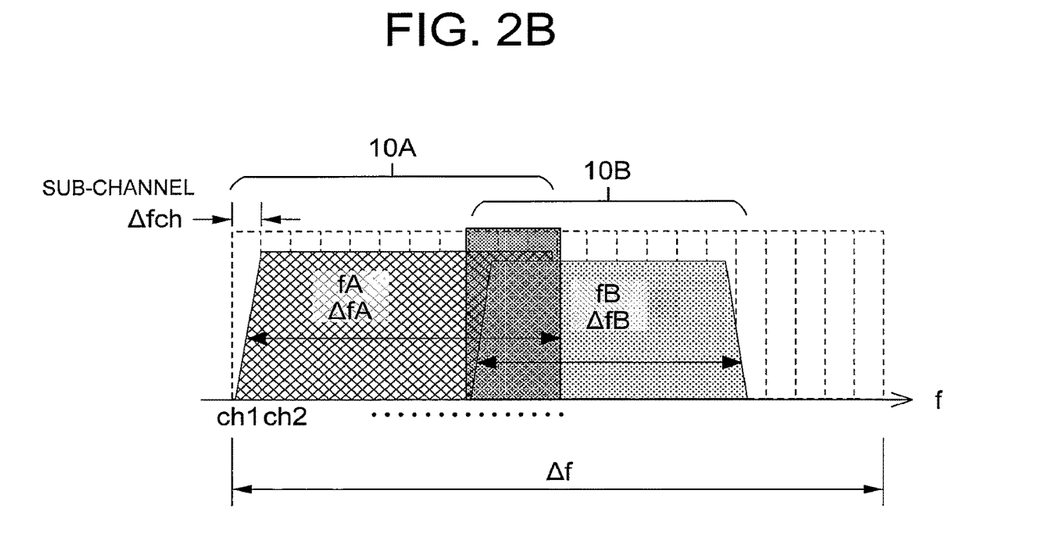
FIG. 2B is an explanatory view for illustrating an outline of the demultiplexing processing in the first embodiment of the present invention.

FTG. 2A and FIG. 2B are explanatory views for illustrating an outline of demultiplexing processing in the first embodiment of the present invention. For example, when the demultiplexing unit 13a divides a reception signal into sub-channels and phase compensation is successfully performed on each sub-channel, the output signals 24A to 24D can be generated by the combiner 23 in one reception beam forming unit 20. In this case, however, it is required that frequencies of the reception beams 10A to 10D do not overlap as illustrated in FIG. 2A.

As illustrated in FIG. 2B, for example, when the frequency of the reception beam 10A overlaps with the frequency of the reception beam 10B, the one reception beam forming unit 20 cannot perform phase compensation on the overlapping portion, and the combiner 23 in the one reception beam forming unit 20 cannot generate the output signal 24A and the output signal 24B. In this case, it is required to separately provide demultiplexing units 13 and reception beam forming units 20 for the reception beam 10A and the reception beam 10B. The beams may be separated through use of, for example, polarization waves. The beams having different polarization waves may be separated by a polarization separator or other device, and then resultant signals may be input to different demultiplexing units 13 and different reception beam forming units 20.

Information about an occupied band of each of the reception beams 10A to 10B can be transmitted to the satellite receiver 1 through transmission of a command from the ground, for example, as described below.

Upon detecting correlation, the correlation detection unit 22 in the reception beam forming unit 20 determines correlation between a reception antenna element that receives the highest power and other reception antenna elements. As a result, the correlation detection unit 22 can determine a relative phase difference from the reception antenna element that receives the highest power, which is set as a reference element. That is, as illustrated in FIG. 1, in the configuration that adopts the four elements: the reception antenna elements 11a to 11d, the correlation detection unit 22 can determine correlation between one reception antenna element set as the reference element and three other reception antenna elements.

Further, upon detecting correlation, the correlation detection unit 22 calculates correlation for each sub-channel obtained in the demultiplexing units 13a to 13d. The thus-calculated relative phase difference between the reception antenna elements corresponds to the incoming direction of each reception beam.

The phase compensation units 25a to 25d each perform phase compensation on a corresponding demultiplexed reception signal based on the relative phase difference calculated by the correlation detection unit 22. After that, the signals that have been phase-compensated by the phase compensation units 25a to 25d are combined by the combiner 23, to generate the output signals 24A to 24D. Through the above-mentioned series of processing, the satellite receiver 1 can maximize output power of the output signals 24A to 24D that are finally output.

Although it is ideally assumed, for simple description, that the reception antenna elements have no difference in path length, even when the path length varies among the reception antenna elements due to variations in characteristics of components of the satellite receiver, a path length difference in stages previous to the correlation detection unit 22 is detected as a phase difference between the elements by the correlation detection unit 22. Thus, such a difference is compensated by the phase compensation units 25a to 25d.

Figure 3:
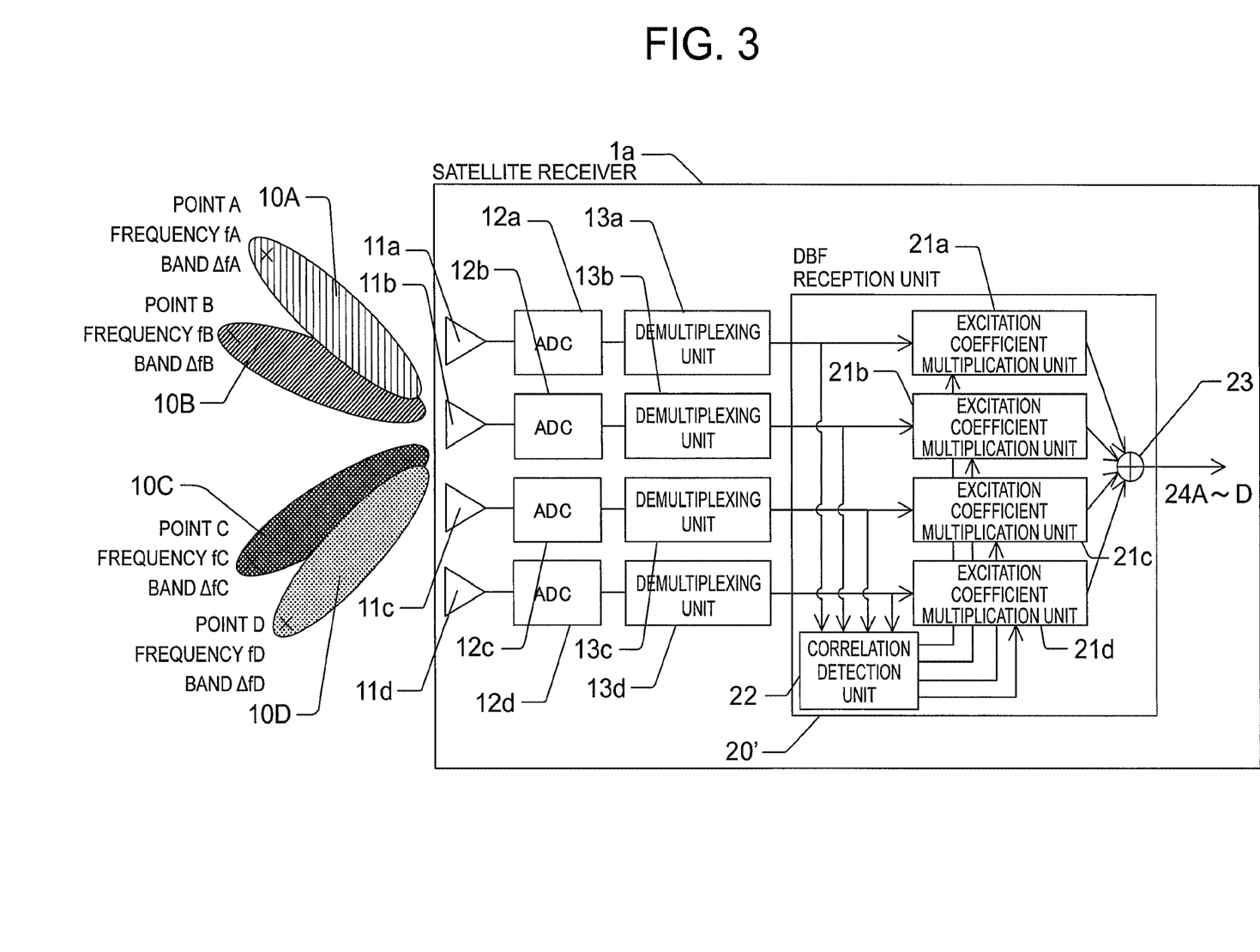
FIG. 3 is a diagram for illustrating an internal configuration of a satellite receiver configured to perform digital processing according to the first embodiment of the present invention.

Next, the case of adopting digital processing is descried in detail as a suitable configuration example for achieving the satellite receiver 1 according to the first embodiment. FIG. 3 is a diagram for illustrating an internal configuration of a satellite receiver configured to perform digital processing according to the first embodiment of the present invention.

Compared with the above-mentioned configuration of FIG. 1, the configuration of FIG. 3 is different in that analog-to-digital converters (ADCs) 12a to 12d are additionally provided, and excitation coefficient multiplication units 21a to 21d are adopted as specific configuration examples of the phase compensation units 25a to 25d, respectively. Thus, a detailed description is given below of an operation of a satellite receiver 1a of FIG. 3, focusing on the above-mentioned differences.

The ADC 12a is provided between the reception antenna element 11a and the demultiplexing unit 13a. Similarly, the ADCs 12b to 12d are respectively provided between the reception antenna elements 11b to 11d and the demultiplexing units 13b to 13d. The ADCs 12a to 12d respectively convert the reception signals from the reception antenna elements 11a to 11d into digital signals. After that, the demultiplexing units 13a to 13d demultiplex into sub-channels the reception signals converted into the digital signals by a certain frequency band.

The signal received by the reception antenna element 11a is converted into a digital signal by the ADC 12a. A sampling frequency fs of the ADC 12a is selected so as to satisfy the sampling theorem for a reception signal. When the original frequency does not satisfy the sampling theorem, intermediate frequency (IF) conversion or other method is additionally applied so as to satisfy the condition of the sampling theorem. Further, aliasing may be removed through filter processing as required.

Figure 4:
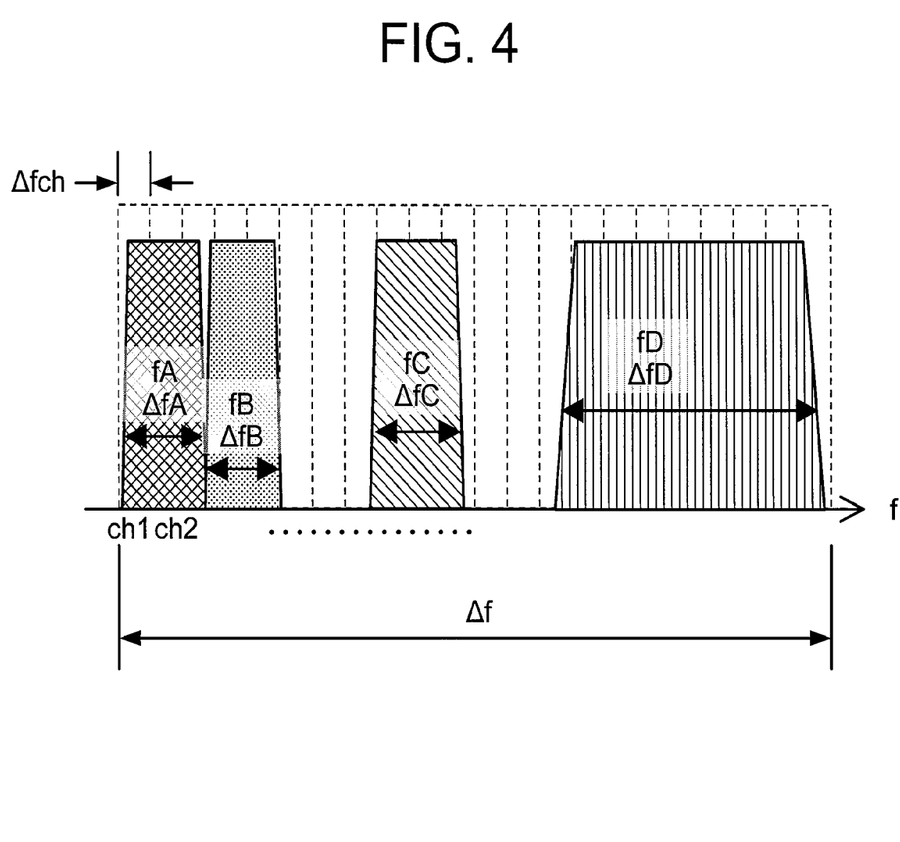
FIG. 4 is an explanatory view for illustrating an outline of demultiplexing processing executed by each demultiplexing unit of FIG. 3 in the first embodiment of the present invention.

FIG. 4 is an explanatory view for illustrating an outline of demultiplexing processing executed by each demultiplexing unit of FIG. 3 in the first embodiment of the present invention. The demultiplexing unit 13a has a function of performing quadrature detection on a reception signal converted into a digital signal by the ADC 12a, and analyzing a spectrum thereof. The demultiplexing unit 13a performs spectral resolution on the signal for each sub-channel having resolution corresponding to a band $\Delta fch$ out of the entire band $\Delta f$. Thus, the number Nch of sub-channels is represented by the following expression:

$$Nch=\Delta f/\Delta fch.$$

Further, through the quadrature detection, two spectrum-resolved signals being an I signal and a Q signal are output. FIG. 4 is a conceptual view for illustrating only one of the two signals.

Upon detecting correlation, the correlation detection unit 22 in a DBF reception unit 20' determines correlation between a spectrum-resolved signal from a reception antenna element that receives the highest power, and spectrum-resolved signals from other reception antenna elements. As a result, the correlation detection unit 22 can determine a relative phase difference from the reception antenna element that receives the highest power, which is set as a reference element. Further, the correlation detection unit 22 calculates, based on the calculated relative phase difference, an excitation coefficient for cancelling the phase difference between the reception antenna elements.

Figure 5:
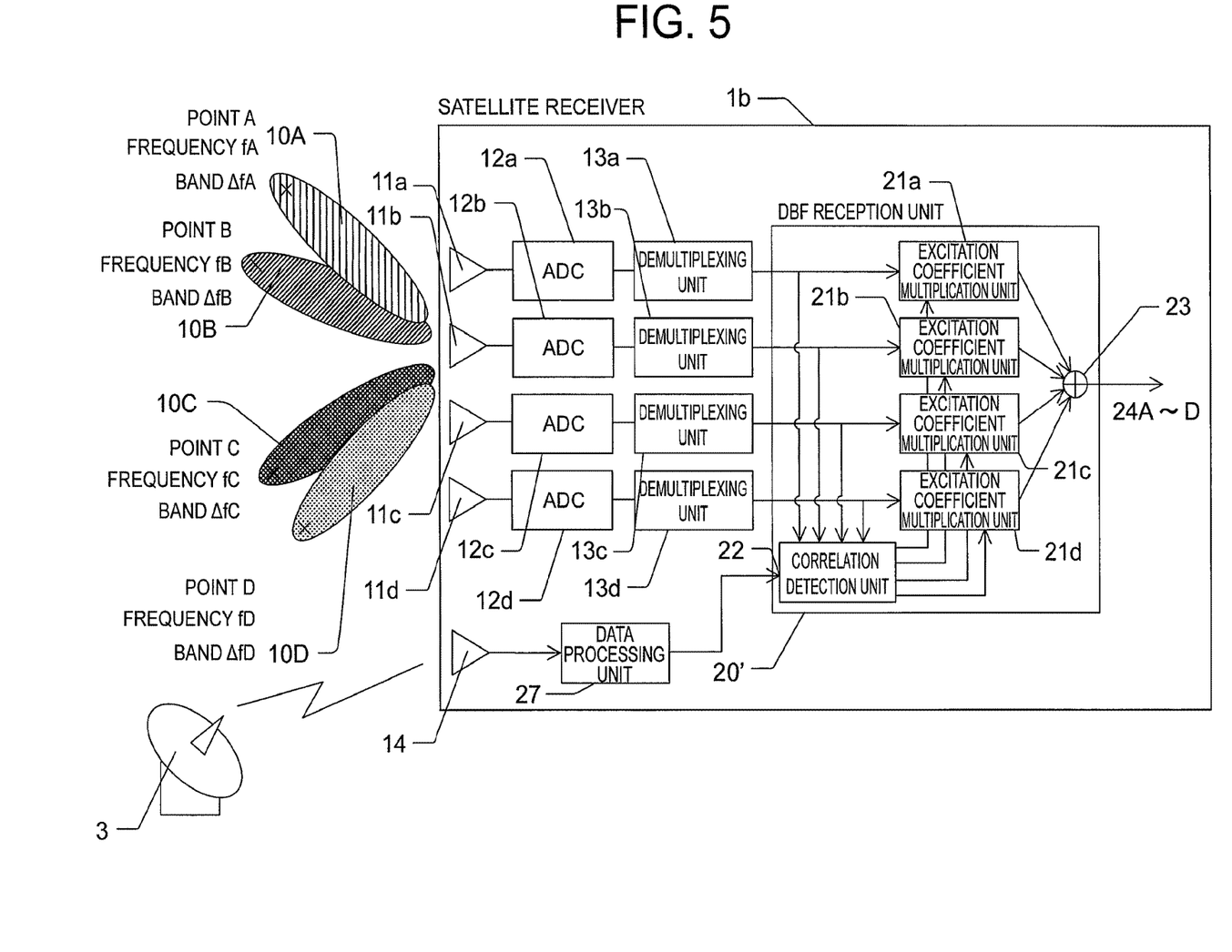
FIG. 5 is a diagram for illustrating an internal configuration of a satellite receiver configured to perform digital processing according to the first embodiment of the present invention, which is different from the above-mentioned configuration of FIG. 3.

FIG. 5 is a diagram for illustrating an internal configuration of a satellite receiver 1b configured to perform digital processing according to the first embodiment of the present invention, which is different from the above-mentioned configuration of FIG. 3. Compared with the above-mentioned configuration of FIG. 3, the satellite receiver 1b of FIG. 5 further includes a ground command acquisition antenna 14 and a data processing unit 27.

With regard to spectrum-resolved signals whose correlation is to be determined by the correlation detection unit 22, it is required that their corresponding frequencies include communication waves or other significant signals. The ground command acquisition antenna 14 and the data processing unit 27 are provided to confirm the presence or absence of such a significant signal. For example, a ground control station 3 that controls the entire communication system gives a notification that is notification information about the significant signal, via a command line. Specifically, the ground control station 3 can send as a command, frequency and band assigned to a transmission beam from a ground terminal.

In contrast, the data processing unit 27 can give a notification to the correlation detection unit 22 so that the correlation detection unit 22 determines correlation between specified spectrum-resolved signals, based on the notification information obtained via the ground command acquisition antenna 14. Specifically, the data processing unit 27 converts the received command into information indicating which sub-channel corresponds to which beam, and notifies the correlation detection unit 22 of the information.

Consequently, the correlation detection unit 22 can identify a frequency including a significant signal based on the notification from the data processing unit 27, and then perform correlation processing for each sub-channel. As a result, for example, when any band is unused, correlation detection processing is not required for that band. This can contribute to low power consumption.

Further, the ground control station 3 can determine traffic to be assigned to a terminal, and notify and set information about an available band to the terminal, for example, via a ground base station (not shown). For example, when large-capacity communication is to be performed locally at the point A, the ground control station 3 may assign a wide band to the point A.

The excitation coefficient multiplication units 21a to 21d respectively multiply signals demultiplexed by the demultiplexing units 13a to 13d by a corresponding excitation coefficient calculated by the correlation detection unit 22. Assuming that the reception signals from the reception antenna elements are combined by the combiner 23 without being multiplied by a corresponding excitation coefficient, the reception signals from the reception antenna elements have a relative phase difference, which results in reduction in signal-to-noise (S/N) ratio.

Figure 6:
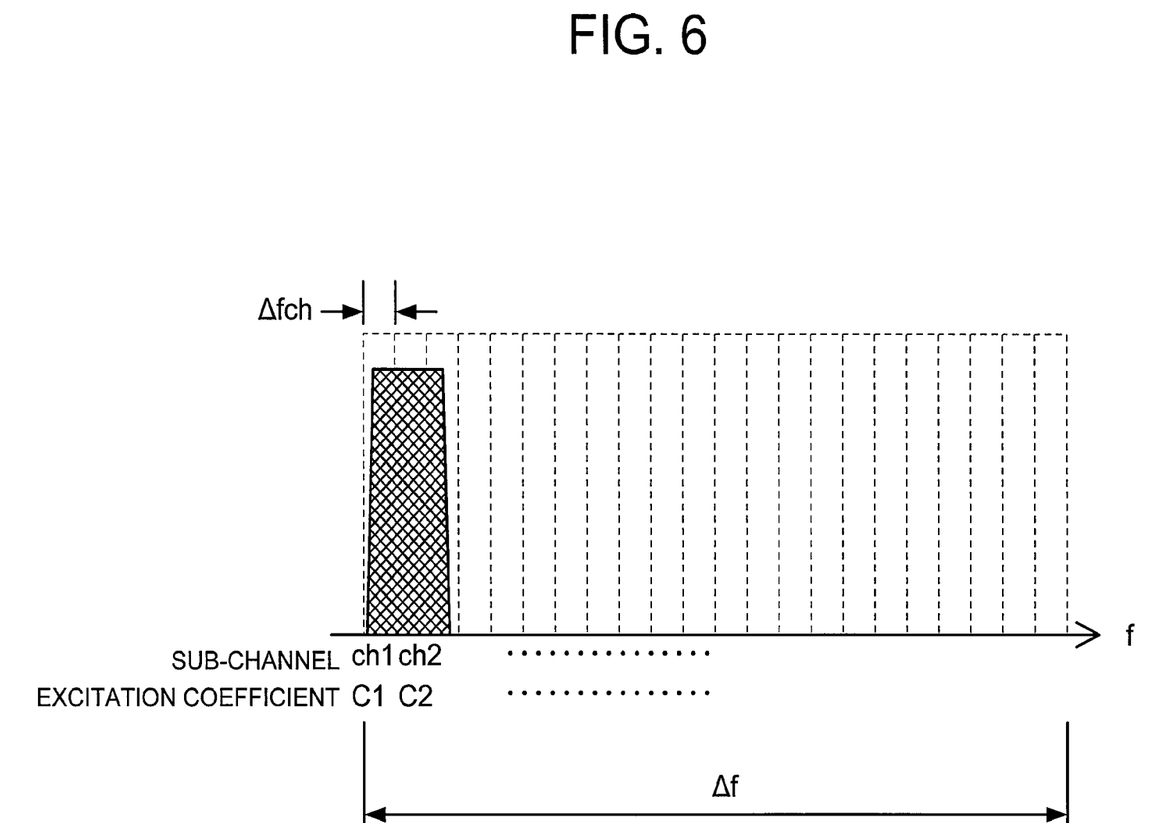
FIG. 6 is an explanatory view for illustrating a function of each excitation coefficient multiplication unit in the first embodiment of the present invention.

Meanwhile, FIG. 6 is an explanatory view for illustrating a function of each excitation coefficient multiplication unit in the first embodiment of the present invention. With the configuration of the satellite receiver 1 of the first embodiment, the correlation detection unit 22 automatically calculates a relative phase difference between the reception antenna elements for each sub-channel, and the excitation coefficient multiplication units 21a to 21d respectively multiply the signals demultiplexed by the demultiplexing units 13a to 13d by a corresponding excitation coefficient for correcting the relative phase difference. Consequently, the reduction in S/N ratio can be prevented, and the reception efficiency is improved.

The combiner 23 combines the signals from the reception antenna elements which have been multiplied by a corresponding excitation coefficient for each sub-channel. As a result of the synthesis, the phases of the reception signals from the reception antenna elements are aligned, to thereby automatically optimize the (S/N) ratio of the output signals 24A to 24D.

When the digital processing is performed as described above with the configuration illustrated in FIG. 3 to FIG. 6, a data string sampled by each of the ADCs 12a to 12d is divided by the demultiplexing units 13a to 13d into sub-channels through fast Fourier transform (FFT). Then, the data divided into sub-channels is processed as follows: the correlation detection unit 22 calculates an excitation coefficient of each reception antenna element for each sub-channel, and in addition, the excitation coefficient multiplication units 21a to 21d perform phase compensation the reception signals from on the reception antenna elements.

Therefore, adopting the digital processing is advantageous in that stages subsequent to the ADCs 12a to 12d can be configured by an integrated circuit such as an ASIC or an FPGA, and the satellite receivers 1a and 1b can be down-sized.

It is possible to set a specific excitation coefficient for each sub-channel. Thus, even when the number of beams increases, a suitable excitation coefficient can be determined through calculation of a relative phase difference for each sub-channel.

Further, when a function of calculating a relative phase difference for each sub-channel is provided, it is not always required to provide the DBF reception unit 20' for each reception beam. In this case, it is only required to provide at least one DBF reception unit 20' as illustrated in FIG. 3 or FIG. 5. That is, one DBF reception unit 20' may process the reception beams 10A to 10D, for example. This is based on the fact that an excitation coefficient can be set for each sub-channel. In this case, however, it is a precondition that frequencies of the reception beams 10A to 10D do not overlap.

Further, in the above-mentioned first embodiment, the number of reception beams is four, and the number of reception antenna elements is four, but the present invention is not limited thereto, and the numbers of reception beams and reception antenna elements can be increased.

As described above, a satellite communication system including the satellite receiver according to the first embodiment produces the following effects compared with a related-art satellite communication system.

(Effect 1) It is possible to maximize the reception efficiency of the satellite receiver with respect to a plurality of signal senders on the ground.

(Effect 2) Even when a sender on the ground moves, an excitation coefficient is automatically recalculated, to thereby maintain the reception efficiency.

Second Embodiment

In a second embodiment of the present invention, a description is given of a satellite communication system configured by combining the satellite receiver described in the first embodiment with a satellite transmitter.

Figure 7:
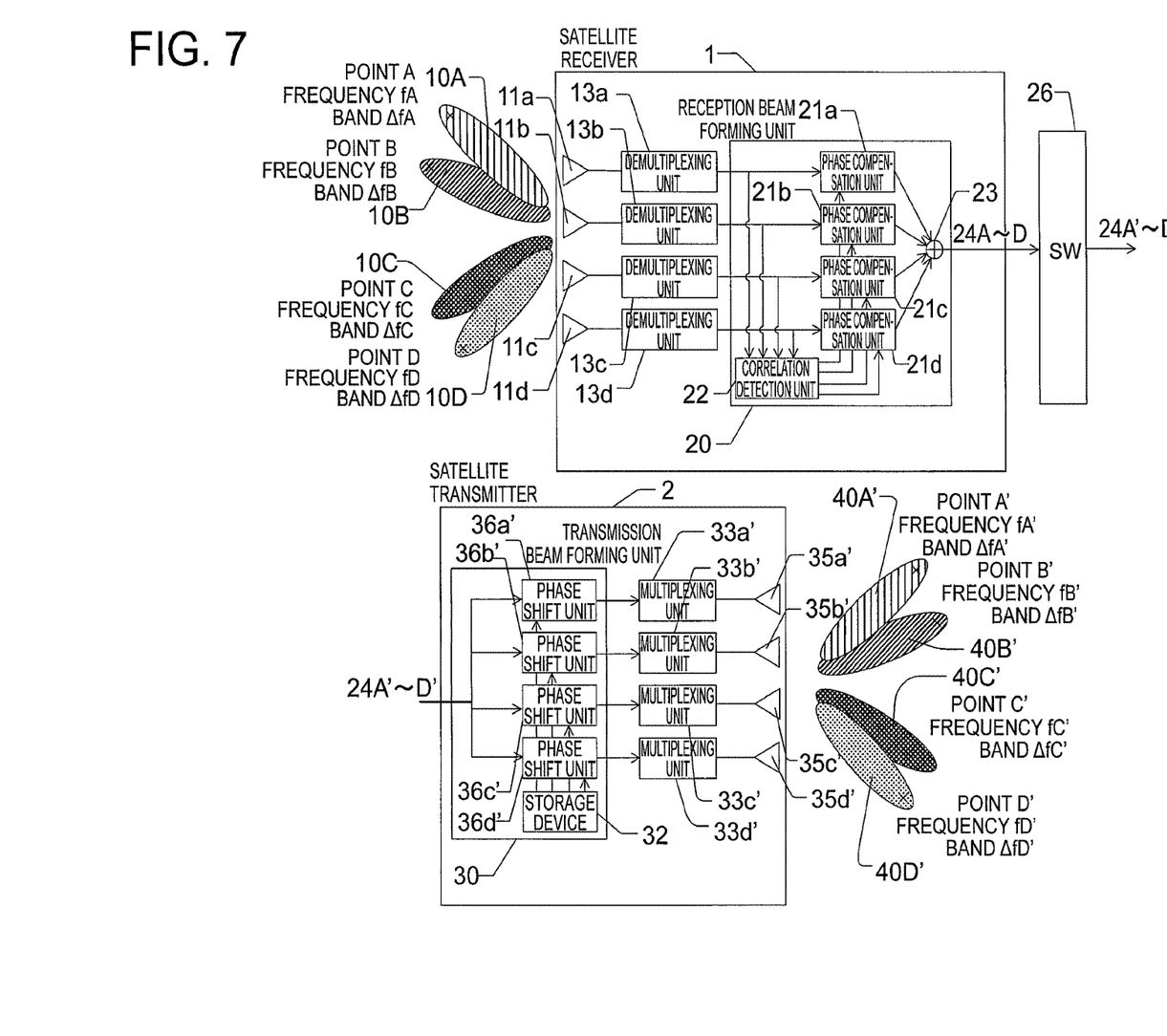
FIG. 7 is a diagram for illustrating a configuration of a satellite communication system according to a second embodiment of the present invention.

FIG. 7 is a diagram for illustrating a configuration of the satellite communication system according to the second embodiment of the present invention. The satellite communication system according to the second embodiment is intended to receive at the same time the reception beams 10A to 10D being communication signals from four points, or the points A to D, and exchange the communication signals and combine/separate bands thereof, and then form transmission beams 40A' to 40D' being new beams and transmit the beams to recipients at new points A' to D' on the ground.

In the second embodiment, the satellite receiver on the reception side has the same configuration as that of the above-mentioned first embodiment. The configuration of the satellite communication system according to the second embodiment includes a switch 26 and a satellite transmitter 2 in addition to the configuration of the satellite receiver 1 of the above-mentioned first embodiment.

The switch 26 is configured to receive the output signals 24A to 24D, and exchange the signals and combine/separate bands thereof, to generate transmission signals 24A' to 24D'.

The satellite transmitter 2 includes a transmission beam forming unit 30, multiplexing units 33$a'$ to 33$d'$, and transmission antenna elements 35$a'$ to 35$d'$. The transmission beam forming unit 30 is configured to set phase shift amount for forming a transmission beam for each transmission antenna element. The multiplexing units 33$a'$ to 33$d'$ are configured to multiplex transmission signals corresponding to the transmission beams in a frequency domain, and emit the signals to the new points A' to D' on the ground via the transmission antenna elements 35$a'$ to 35$d'$.

The transmission beam forming unit 30 includes a storage device 32 and phase shift units 36$a'$ to 36$d'$. Here, the storage device 32 previously stores therein a phase shift amount set upon directing a transmission beam to each of the points A' to D' being specific reception points on the ground. Further, it is possible to store an excitation coefficient in the storage device 32 based on information obtained by the correlation detection unit 22 of the satellite receiver 1, or to determine phase shift amount applied by the phase shift units 36$a'$ to 36$d'$ in accordance with a ground command as described later.

Then, the phase shift units 36$a'$ to 36$d'$ respectively shift the phases of the transmission signals 24A' to 24D' of the transmission antenna elements in accordance with the phase shift amount. Further, the multiplexing units 33$a'$ to 33$d'$ multiplex in the frequency domain the transmission signals corresponding to the beams that have been phase-shifted in accordance with the phase shift amount, and convert the transmission signals into time-domain signals, to thereby generate the transmission beams 40A' to 40D'. Further, the multiplexing units 33$a'$ to 33$d'$ emit the transmission beams 40A' to 40D' toward the points A' to D' via the transmission antenna elements 35$a'$ to 35$d'$.

A frequency fA' is assigned to the transmission beam 40A', a frequency fB' is assigned to the transmission beam 40B', a frequency fC' is assigned to the transmission beam 40C', and a frequency fD' is assigned to the transmission beam 40D'. Further, bands of the transmission beams 40A', 40B', 40C', and 40D' are defined as ΔfA', ΔfB', ΔfC', and ΔfD', respectively.

The satellite communication system according to the second embodiment has, as a satellite relay device, a function of assigning frequencies to recipients on the ground, and flexibly changing transmission beams from the satellite to the ground while optimizing reception efficiency for communication signals from senders on the ground.

Figure 8:
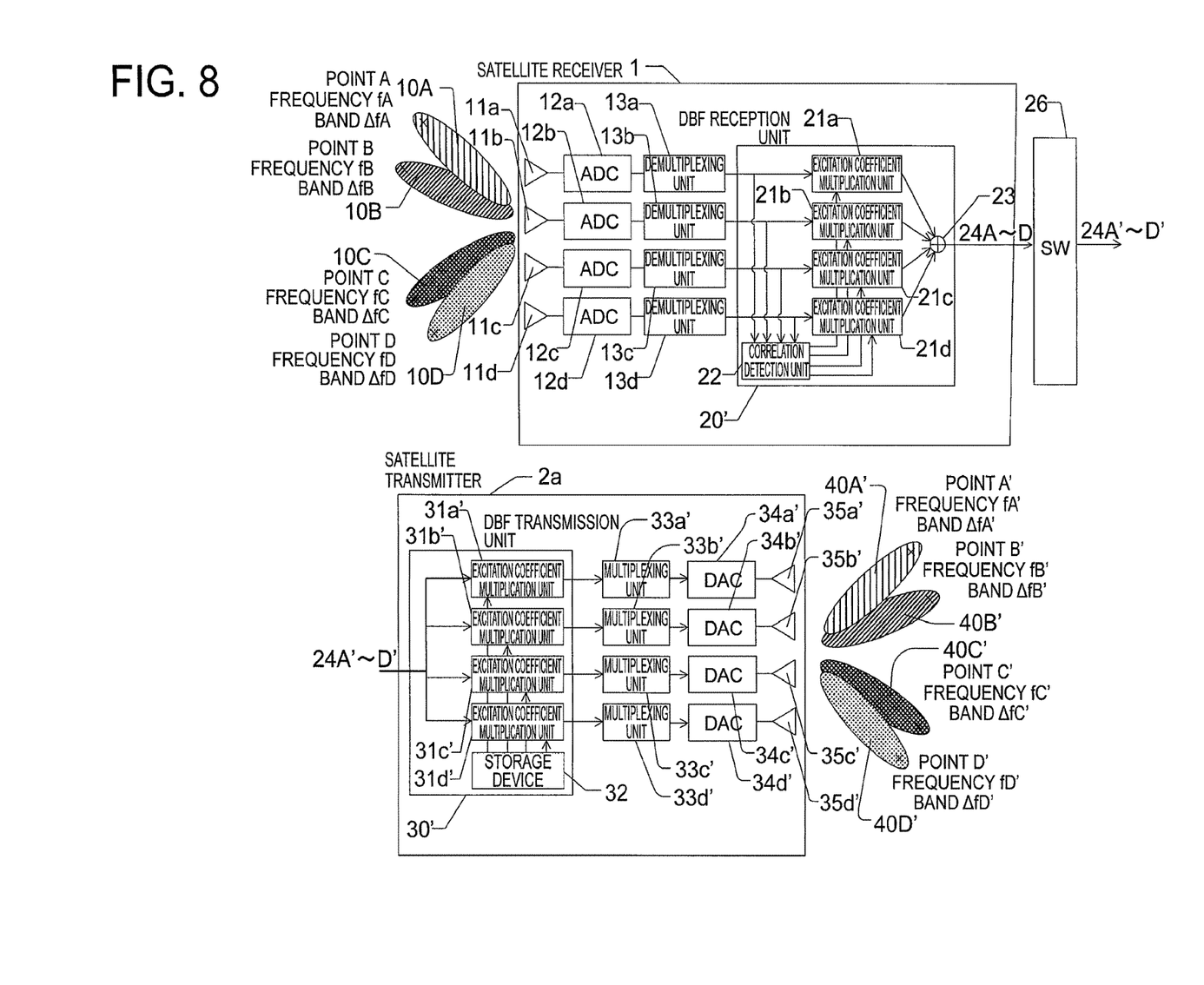
FIG. 8 is a diagram for illustrating a configuration of the satellite communication system configured to perform digital processing according to the second embodiment of the present invention.

Next, the case of adopting digital processing is descried in detail as a suitable configuration example for achieving the satellite communication system according to the second embodiment. The operation of the satellite receiver 1 is the same as that of the above-described first embodiment, and thus a description thereof is omitted. FIG. 8 is a diagram for illustrating a configuration of the satellite communication system configured to perform digital processing according to the second embodiment of the present invention.

Compared with the above-mentioned configuration of FIG. 7, the configuration of FIG. 8 is different in that digital-to-analog converters (DACs) 34$a'$ to 34$d'$ are additionally provided, and excitation coefficient multiplication units 31$a'$ to 31$d'$ are adopted as specific configuration examples of the phase shift units 36$a'$ to 36$d'$, respectively. Thus, a detailed description is given below of an operation of the satellite communication system of FIG. 8, focusing on the above-mentioned differences.

The switch 26 is configured to receive the output signals 24A to 24D being outputs from the satellite receiver 1. The switch 26 has a function of exchanging the output signals 24A to 24D in the frequency domain and combining/separating bands thereof, and then outputting the transmission signals 24A' to 24D'.

Figure 9:
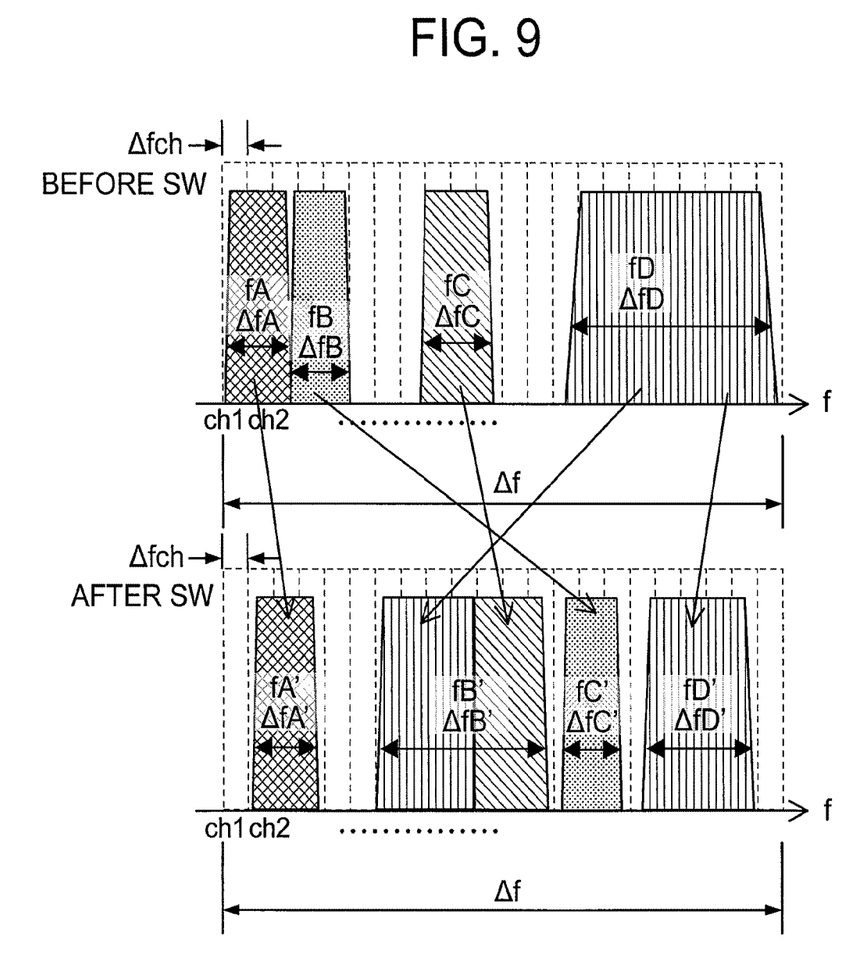
FIG. 9 is an explanatory conceptual view for illustrating a function of a switch in the second embodiment of the present invention.

FIG. 9 is an explanatory conceptual view for illustrating the function of the switch 26 in the second embodiment of the present invention. In the illustrated example of FIG. 9, the switch 26 performs the following processing to form the transmission signals 24A' to 24D':
changing the frequency of the output signal 24A to form the transmission signal 24A';
changing the frequency of the output signal 24B to form the transmission signal 24C';
dividing the output signal 24D into two, and combining the output signal 24C and a part of the output signal 24D to form the transmission signal 24B'; and
forming the transmission signal 24D' from the remaining part of the output signal 24D.

Through the above-mentioned assignment of the transmission signals 24A' to 24D', the switch 26 contributes to throughput flexibility upon transmission and reception as the satellite relay device.

The transmission signals 24A' to 24D' newly formed by the switch 26 are input to the satellite transmitter 2. The transmission signals 24A' to 24D' are input to a DBF transmission unit 30', and separated into signals corresponding to the number of transmission antenna elements. The excitation coefficient multiplication units 31$a'$ to 31$d'$ perform processing of multiplying the separated transmission signals 24A' to 24D' respectively corresponding to transmission antenna elements 35$a'$ to 35$d'$ by a corresponding excitation coefficient required for generating the transmission beams.

Here, the excitation coefficient is set for each sub-channel (band Δfch). The storage device 32 previously stores therein a map of excitation coefficients of the transmission antenna elements required for forming a beam for a specific point. Accordingly, the excitation coefficient multiplication units 31$a'$ to 31$d'$ each read a corresponding excitation coefficient in accordance with the transmission direction, and perform the above-mentioned multiplication processing.

It is not always required to provide the DBF transmission unit 30' for each transmission beam. In this case, it is only required to provide at least one DBF transmission unit 30' as illustrated in FIG. 8. That is, one DBF transmission unit 30' may process the transmission beams 40A' to 40D', for example. This is based on the fact that an excitation coefficient can be set for each sub-channel. In this case, however, it is a precondition that frequencies of the transmission beams 40A' to 40D' do not overlap as in the DBF reception unit 20' described above in the above-mentioned first embodiment.

Figure 10:
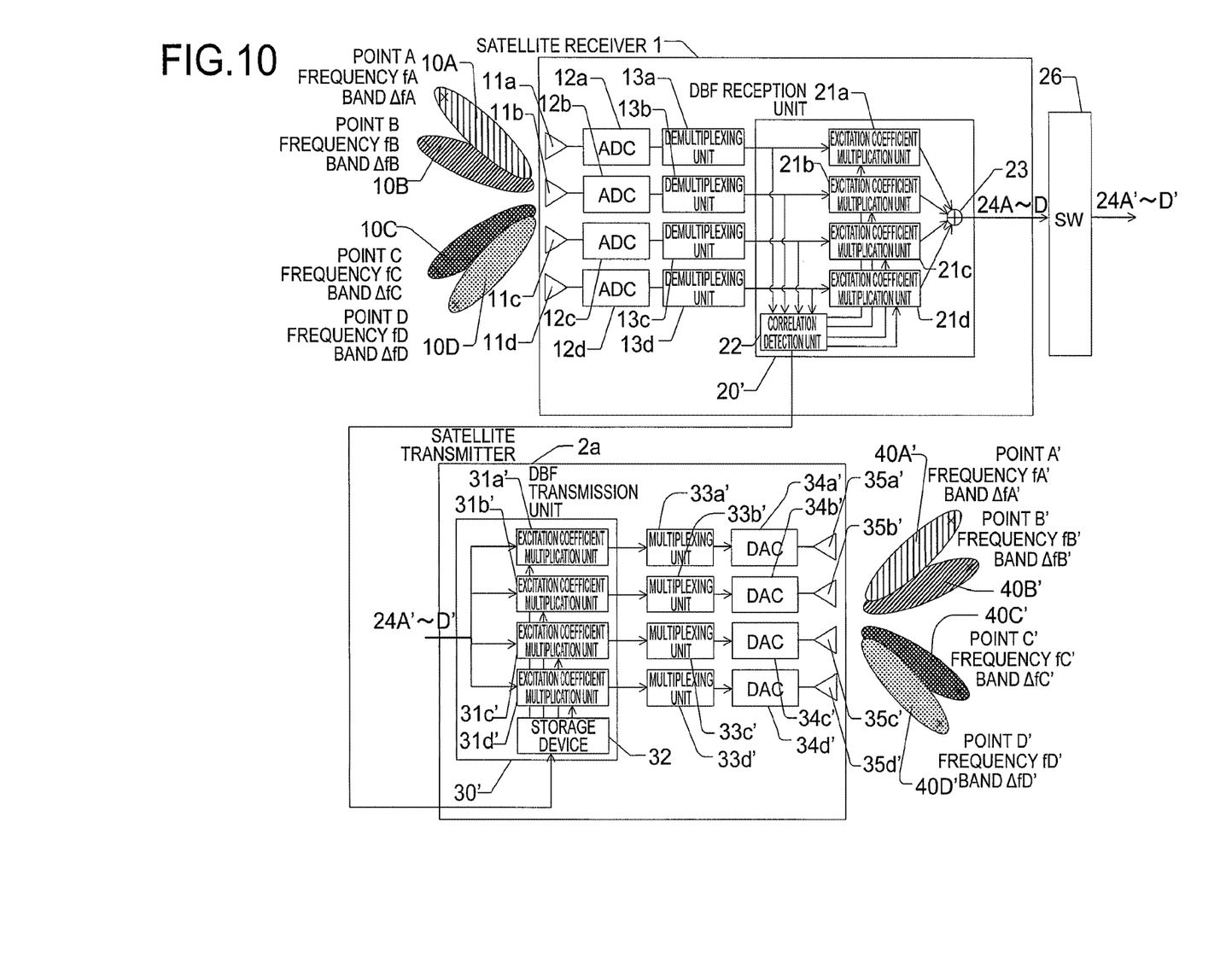
FIG. 10 is a diagram for illustrating a configuration of the satellite communication system configured to perform digital processing according to the second embodiment of the present invention, which is different from the above-mentioned configuration of FIG. 8.

Further, the following configuration is also applicable: an excitation coefficient for use on the satellite transmitter 2a side is stored in the storage device 32 based on information of the correlation detection unit 22 included in the DBF reception unit 20'. FIG. 10 is a diagram for illustrating a configuration of the satellite communication system configured to perform digital processing according to the second embodiment of the present invention, which is different from the above-mentioned configuration of FIG. 8. Compared with the above-mentioned configuration of FIG. 8, the storage device 32 of FIG. 10 has a configuration to store therein an excitation coefficient generated by the correlation detection unit 22 in the satellite receiver 1 based on the correlation processing.

In this case, the direction of the transmission beam 40A' is the same as that of the reception beam 10A. That is, the point A matches the point A'. With this configuration, it is possible to maintain communication quality upon transmission and reception with respect to a mobile terminal on the ground.

The multiplexing units 33a' to 33d' of FIG. 8 or FIG. 10 have a function of multiplexing output signals from the DBF transmission unit 30' on a frequency axis, and converting the resultant signals into digital signals in real time. The output signals from the DBF transmission unit 30' are spectrum data of quadrature signals being the I signal and the Q signal, and are converted by the multiplexing units 33a' to 33d' into digital signals in real time.

The DACs 34a' to 34d' convert the digital signals output from the multiplexing units 33a' to 33d' into analog signals.

The transmission antenna elements 35a' to 35d' emit the analog transmission signals output from the DACs 34a' to 34d' to the space, to thereby generate the transmission beams 40A' to 40D'.

In the foregoing description of the second embodiment, the number of reception beams is four, the number of transmission antenna elements is four, and the number of transmission beams is four, but the present invention is not limited thereto, and the numbers of reception beams, transmission antenna elements, and transmission beams can be increased.

As described in the above-mentioned first embodiment, with regard to spectrum-resolved signals whose correlation is to be determined by the correlation detection unit 22, it is required that their corresponding frequencies include communication waves or other significant signals. To that end, the following configuration has been described with reference to FIG. 5: the ground command acquisition antenna 14 and the data processing unit 27 are provided so that the presence or absence of such a significant signal can be confirmed through utilization of information notified via the ground command line.

The excitation coefficient for use in the DBF transmission unit 30' in the second embodiment may be similarly determined based on information notified via the ground command line.

As described above, the satellite communication system according to the second embodiment produces the following effects compared with a related-art satellite communication system.

(Effect 1) It is possible to maximize the reception efficiency of the satellite communication system with respect to a plurality of signal senders on the ground.
(Effect 2) Even when a sender on the ground moves, an excitation coefficient is automatically recalculated, to thereby maintain the transmission and reception efficiency.
(Effect 3) It is possible to freely change available frequency bands assigned to a plurality of senders and recipients.

REFERENCE SIGNS LIST 1, 1a, 1b satellite receiver, 2, 2a satellite transmitter, 3 ground control station, 11a to 11d reception antenna element, 13a to 13d demultiplexing unit, 14 ground command acquisition antenna, 21a to 21d excitation coefficient multiplication unit, 22 correlation detection unit, 23 combiner, 25a to 25d phase compensation unit, 26 switch, 27 data processing unit, 31a' to 31d' excitation coefficient multiplication unit, 32 storage device, 33a' to 33d' multiplexing unit, 35a' to 35d' transmission antenna element, 36a' to 36d' phase shift unit.

The invention claimed is:
1. A satellite receiver, comprising:
N reception antenna elements;
N demultiplexers configured to demultiplex reception signals from the N reception antenna elements into sub-channels;
correlation circuitry configured to identify a reception antenna element, of the N reception antenna elements, that receives a highest power, set the reception antenna element as a reference element, perform correlation processing on each of the reception signals demultiplexed by the N demultiplexers with the reception antenna element, of the N reception antenna elements, that receives the highest power and was set as the reference element so as to calculate a relative phase difference, and calculate an excitation coefficient for cancelling a phase difference between the N reception antenna elements for each of the sub-channels based on the calculated relative phase difference;
N phase compensators configured to multiply the reception signals demultiplexed by the N demultiplexers, respectively, by the excitation coefficient for each of the sub-channels; and
a combiner configured to combine multiplication results from the N phase compensators for each of the sub-channels to generate output signals,
wherein N is an integer of two or more.
2. The satellite receiver according to claim 1, further comprising:
a ground command acquisition antenna configured to receive notification information for limiting a frequency to be subjected to the correlation processing by the correlation circuitry, the notification information being transmitted from a ground control station; and
a data processing circuit configured to give a notification to the correlation circuitry so that the correlation circuitry determines correlation between spectrum-resolved signals having the limited frequency, based on the notification information obtained via the ground command acquisition antenna.
3. A satellite communication system, comprising:
a satellite receiver;
a switch; and
a satellite transmitter, the satellite receiver including:
N reception antenna elements;
N demultiplexers configured to demultiplex reception signals from the N reception antenna elements into sub-channels;
correlation circuitry configured to perform correlation processing on each of the reception signals demultiplexed by the N demultiplexers with a reception antenna element that receives the highest power being set as a reference element so as to calculate a relative phase difference, and calculate an excitation coefficient for cancelling a phase difference between the N reception antenna elements for each of the sub-channels based on the calculated relative phase difference;
N phase compensators configured to multiply the reception signals demultiplexed by the N demultiplexers, respectively, by the excitation coefficient for each of the sub-channels; and
a combiner configured to combine multiplication results from the N phase compensators for each of the sub-channels to generate output signals corresponding to the N reception antenna elements,
the switch being configured to exchange the output signals generated by the combiner for each of the sub-channels in a frequency domain, to output transmission signals,
the satellite transmitter including:
a memory to store therein a transmission excitation coefficient associated with a transmission direction of a corresponding transmission beam;
N phase shifters configured to read from the memory the transmission excitation coefficient in accordance with the transmission direction of a corresponding transmission beam, and multiply a corresponding transmission signal output from the switch by the read transmission excitation coefficient;
N multiplexers configured to multiplex multiplication results from the N phase shifters on a frequency axis; and
N transmission antennas configured to emit signals multiplexed by the N multiplexers to a space so as to generate transmission beams,
wherein N is an integer of two or more.

4. The satellite communication system according to claim 3, wherein the satellite receiver further includes:
a ground command acquisition antenna configured to receive notification information for limiting a frequency to be subjected to the correlation processing by the correlation circuitry, the notification information being transmitted from a ground control station; and
a data processing circuit configured to give a notification to the correlation circuitry so that the correlation circuitry determines correlation between spectrum-resolved signals having the limited frequency, based on the notification information obtained via the ground command acquisition antenna.

5. The satellite communication system according to claim 4,
wherein, when a direction of a reception beam is the same as a direction of a transmission beam,
the correlation circuitry in the satellite receiver causes the memory in the satellite transmitter to store therein the calculated excitation coefficient, and
the N phase shifters are configured to set as the transmission excitation coefficient the excitation coefficient read from the memory, to multiply the transmission signals output from the switch by the transmission excitation coefficient.

6. The satellite communication system according to claim 3,
wherein, when a direction of a reception beam is the same as a direction of a transmission beam,
the correlation circuitry in the satellite receiver causes the memory in the satellite transmitter to store therein the calculated excitation coefficient, and
the N phase shifters are configured to set as the transmission excitation coefficient the excitation coefficient read from the memory, to multiply the transmission signals output from the switch by the transmission excitation coefficient.

7. A satellite receiver, comprising:
N reception antenna elements;
N demultiplexers configured to demultiplex reception signals from the N reception antenna elements into sub-channels;
correlation circuitry configured to perform correlation processing on each of the reception signals demultiplexed by the N demultiplexers with a reception antenna element, of the N reception antenna elements, that receives a highest power being set as a reference element so as to calculate a relative phase difference, and calculate an excitation coefficient for cancelling a phase difference between the N reception antenna elements for each of the sub-channels based on the calculated relative phase difference;
N phase compensators configured to multiply the reception signals demultiplexed by the N demultiplexers, respectively, by the excitation coefficient for each of the sub-channels; and
a combiner configured to combine multiplication results from the N phase compensators for each of the sub-channels to generate output signals,
wherein N is an integer of two or more, and
wherein the correlation circuitry is further configured to determine a correlation between spectrum-resolved signals having a frequency that is limited, based on receiving, from a ground command acquisition antenna, notification information, transmitted from a ground control station, for limiting the frequency to be subjected to the correlation process.

* * * * *